(12) United States Patent
Huggett

(10) Patent No.: US 8,073,473 B2
(45) Date of Patent: Dec. 6, 2011

(54) METHOD FOR PROCESSING A MESSAGE

(75) Inventor: Robert Huggett, Reading (GB)

(73) Assignee: Airwide Solutions, Inc, Kanata, On. (CA)

( * ) Notice: Subject to any disclaimer, the term of this patent is extended or adjusted under 35 U.S.C. 154(b) by 913 days.

(21) Appl. No.: 11/559,463

(22) Filed: Nov. 14, 2006

(65) Prior Publication Data

US 2007/0191035 A1    Aug. 16, 2007

Related U.S. Application Data

(60) Provisional application No. 60/735,873, filed on Nov. 14, 2005.

(51) Int. Cl.
*H04W 4/00* (2009.01)
(52) U.S. Cl. ........ 455/466; 370/401; 370/466; 370/392; 370/437
(58) Field of Classification Search .................. 455/466, 455/412, 433, 522, 414, 426, 432, 403, 44; 370/310, 352, 354, 38, 392; 379/88
See application file for complete search history.

(56) References Cited

U.S. PATENT DOCUMENTS

| | | | |
|---|---|---|---|
| 7,133,845 B1 * | 11/2006 | Ginter et al. | 705/51 |
| 7,349,399 B1 * | 3/2008 | Chen et al. | 370/394 |
| 2003/0091020 A1 * | 5/2003 | Bantukul et al. | 370/349 |
| 2004/0176067 A1 * | 9/2004 | Lakhani et al. | 455/406 |
| 2004/0196858 A1 * | 10/2004 | Tsai et al. | 370/401 |
| 2004/0250059 A1 * | 12/2004 | Ramelson et al. | 713/150 |
| 2005/0060414 A1 * | 3/2005 | Phillips et al. | 709/227 |
| 2005/0070278 A1 * | 3/2005 | Jiang | 455/432.3 |
| 2005/0078660 A1 * | 4/2005 | Wood | 370/352 |
| 2005/0287957 A1 * | 12/2005 | Lee et al. | 455/68 |
| 2006/0058048 A1 * | 3/2006 | Kapoor et al. | 455/466 |

* cited by examiner

*Primary Examiner* — Nick Corsaro
*Assistant Examiner* — Mahendra Patel
(74) *Attorney, Agent, or Firm* — Shalom Wertsberger; Saltamar Innovations

(57) ABSTRACT

A method of processing a message in a short message service in which a router or alternatively a gateway makes a first attempt to deliver the message, the deliver attempt failing the router or gateway sends the message and other supporting information to a service center that can store the message and re-attempt delivery of the message. The supporting information provided by the router or gateway enables the service center to process the message in an efficient manner. The supporting information can include a failure type indicator, a charge indicator, a charge reference number, a virtual mobile indicator and a reply indicator.

17 Claims, 5 Drawing Sheets

METHOD FOR PROCESSING A MESSAGE

CROSS-REFERENCE TO RELATED APPLICATIONS

This application claims priority from U.S. Provisional Patent Application Ser. No. 60/735,873, filed Nov. 14, 2005, the entirety of which is incorporated herein by reference.

FIELD OF INVENTION

The present invention relates to the field of communication network based messaging services (e.g. Short Message Services (SMS)). In particular, to a method for processing a message in a messaging service.

BACKGROUND

The following glossary of terms can be referred to by the reader to assist in understanding acronyms and terms used herein.

| Acronym | Definition |
| --- | --- |
| CDMA | Code Division Multiple Access |
| COPS | Common Open Policy Service protocol |
| ESME | External Short Messaging Entity |
| FO | Fixed Network Originated |
| FT | Fixed Network Terminated |
| GSM | Global System for Mobile communication. The dominant mobile radio technology at the time of writing. |
| IMSI | International Mobile Subscriber Identity |
| HLR | Home Location Register. This is the GSM term for the network database that holds those subscription details necessary to deliver service. For example the network address of the node currently serving the subscriber, the services subscribed to, and what supplementary services the subscriber has activated. The American standards have an equivalent database. |
| MAP | Mobile Application Part. The protocol layer that sits between the top of the SS7 stack (TCAP) and the SMS application protocol. In general I refer to GSM MAP, but the equivalent protocol layer exists in the American standards too. |
| MO | Mobile Originated. |
| MT | Mobile Terminated |
| MS | Mobile Station. The combination of a subscriber identity module (SIM) with a handset to create a working mobile telephone. |
| MSC | Mobile Switching Center |
| MMS | Multimedia Message Service |
| MSISDN | Mobile Station Integrated Services Digital Network |
| MWD | Message Waiting Data. That part of the HLR database that records for each mobile subscriber the list of addresses of service centres that have messages queued for the subscriber. When the subscriber connects to the network and becomes reachable the HLR notifies every service centre in the list for that subscriber that the subscriber is now available to receive messages. |
| PDP | A COPS Policy Definition Point |
| PEP | A COPS Policy Enforcement Point |
| SIGTRAN | Sigtran is a working group of the IETF, formed in 1999, and tasked with defining an architecture for the transport of real-time signalling data over IP networks. Its work culminated in not just the architecture, but also the definition of a suite of protocols to carry SS7 and ISDN messages over IP. This protocol suite is made up of a new transport layer—the Stream Control Transmission Protocol (SCTP)—and a set of User Adaptation (UA) layers which mimic the services of the lower layers of SS7 and ISDN. In this paper the term SIGTRAN is used to refer to the stack rather than the committee that invented it. |
| SM | Short Message |
| SMPP | Short Message Peer to Peer protocol |
| SMS | Short Message Service |
| SMSC | Short Message Service Centre |
| SR | Status Report. This is the GSM MAP term for a notification sent back to the originator of an SM informing them of the progress to date in attempting delivery. In this paper I intend the term to include equivalent messages in other protocols—such as SMPP Delivery Receipts. |
| SS7 | Signalling System 7, a telecommunications protocol defined by the International Telecommunication Union (ITU). |
| TDMA | Time Division Multiple Access |
| UDH | User Data Header |

The following documents are referred to in this document by their respective reference numbers. The below cited documents can help the reader to understand this document and each is incorporated herein, in its entirety, by reference.

[1] Universal Mobile Telecommunications System (UMTS); Technical realization of the Short Message Service (SMS), V6.5.0, ETSI TS 23 040, 3GPP, September 2004

[2] Mobile Application Part (MAP) Specification, 6.7.0, ETSI TS 29 002, September 2004

[3] Short Message Peer to Peer; Protocol Specification v3.4, 1.2, SMS Forum, October 1999

[4] Short Message Peer to Peer; Protocol Specification v5.0, SMS Forum, February 2003

FIG. 1 is a schematic representation of an exemplary existing messaging service architecture 100. In the architecture 100 represented in FIG. 1 both a router 104 and a Short Message Service Center (SMSC) 103 have International Telecommunication Union (ITU) Signaling System 7 (SS7) or SIGTRAN interfaces to a mobile network (a.k.a. PLMN) 105. Mobile Application Part (MAP) is used over SS7 or SIGTRAN (see references [1] and [2]). The interface between the router 104 and the SMSC 103 typically uses the same protocol stack as that used to connect these systems to the mobile network 105. The paragraphs that follow describe the main traffic flows through the exemplary messaging service architecture 100.

MO-MT Messages (a.k.a. Person to Person Messages)

MO SM are handled initially by the router 104. Typically 80% or more of MT SM are delivered on the first attempt so the router 104 will immediately attempt to deliver 112 the SM to the intended receiver. If the delivery attempt fails then the router passes 110 the SM to the SMSC 103. The SMSC 103 stores the SM and at a later time makes further attempts to deliver it 109 to the MT receiver.

In this architecture it is possible for MO SM to bypass the router (not illustrated) if the originating mobile is programmed with the address of the SMSC 103 rather than the address of the router 104. Although this is discouraged, it nonetheless is fairly common.

MO-FT Messages (a.k.a. Person to Application Messages)

MO SM 111 are handled initially by the router 104. Typically in excess of 95% FT SM are delivered at the first attempt so the router 104 will immediately attempt to deliver 108 the SM to the intended receiver via the gateway 102. If the delivery attempt fails then the router 104 passes 110 the SM to the SMSC 103. The SMSC 103 stores the SM and at a later time makes further attempts to deliver it 107. All MO SMS-COMMAND (or the CMDA, TDMA or other protocol equivalents) operations messages are sent to the SMSC 103.

FO-MT Messages (a.k.a. Application to Person Messages)

FO SM are initially handled by the gateway 102. If the originator selects single-shot quality of service then the SM is forwarded 113 directly to a router 104 for delivery. If storeand-forward quality of service is selected then the gateway 102 forwards 114 the SM to the SMSC 103 instead. All messages containing update, delete and enquiry operations are sent to the SMSC 103.

Alternatively the gateway 102 can send 113 all FO-MT SM to a router 104 for an initial delivery attempt, and if this fails the gateway 102 can forward them to the SMSC 114 for storage and later re-attempted delivery 109.

Shortcomings of the Existing Implementations

The well known implementations of the messaging architecture suffer from a number of shortcomings. These include:

- The protocol used between the router 104 and the SMSC 103 is in most cases MAP over SS7. SS7 connectivity tends to be expensive and restricted in bandwidth. Some of the drawbacks of this protocol will be alleviated by the rollout of SIGTRAN, but in many networks this is still years away.
- Because the SMSC 103 does not know what the router 104 has done with the message before forwarding it, the SMSC 103 has to make an attempt to deliver the message to determine the message status, register itself with the HLR and determine what retry schedule to use for the message.
- Because the SMSC 103 does not know what the router 104 has done with the message before forwarding it, the SMSC 103 does not know if pre-pay charges have been applied to the SM or not.
- Load balancing between the elements of the solution is difficult to achieve because the protocols used do not support congestion reporting.
- Load balancing between elements of the solution makes the routing of queries, updates and deletion commands difficult. Some implementations address this by simply copying the commands to every SMSC, but this is inefficient.
- Most implementations of this architecture do not cater effectively for the situation where Status Reports are generated by the router or gateway but cannot be delivered.
- The GSM SMS standards allow the originator of an SM to specify that the recipient should be allowed to reply to the SM using the original originators home SMSC 103. For this to work the SMS must keep track of who has sent such SM to whom and to allow exactly one reply. The router 104 needs to be able to police these replies, but it is also necessary for the SMSC 103 to have this information. Existing implementations do not provide a means for the SMSC 103 and router 104 to share this information.
- Typically implementations of the messaging architecture do not handle multi-part messages (i.e. concatenated) well and this can result in either parallel delivery attempts or out of sequence delivery.

The remainder of this section describes each of these issues in turn in more detail. In this document references are made that are specific to GSM. Except where otherwise stated, the analogous technologies related to other well known mobile telephony (e.g. TDMA, CDMA) and message services apply equally.

Interconnect Protocol

Because all SMSC 103 have a MAP/SS7 interface router 104 products use this as the basic interconnect between the router 104 and the SMSC 103. Use of this protocol stack imposes a number of limitations on the interface between routers 104 and SMSC 103:

- MAP is network specific. You need different protocol implementations for different mobile networks (e.g. GSM, CDMA, TDMA)
- The SS7 stack imposes limitations on the size of the messages that can be sent without segmentation. Existing implementations are supposed to, but may not cope with very large "short" messages. This limits the extent to which MAP messages can be safely extended even when the approved extension mechanism is used.
- The basic SS7 infrastructure is expensive for a given bandwidth when compared with TCP/IP over a LAN.
- There is no easy way of adding proprietary operations to MAP.
- The de-facto standard for connecting gateways 102 to SMSC 103 is SMPP v3.4, see reference [3]. This protocol has some limitations but is extensible and is widely supported. SMPP v5 (see reference [4]) is technically a superior protocol to SMPP v3.4 that addresses some, but not all, of the above described limitations.

Superfluous Deliveries

When an SMSC 103 receives an SM from a router 104 or a gateway 102 most SMSC 103 immediately attempt to deliver the SM. If the router 104 or the gateway 102 did not attempt to deliver the SM then this is not a problem, but if it did then this immediate delivery attempt often represents a wasted effort because it will probably fail for the same reason as the failed router or gateway delivery attempt.

In a typical GSM network the breakdown of delivery failures for delivery attempts to the mobile network is as follows:

| Error | Percentage of all delivery failures |
| --- | --- |
| Unknown Subscriber (Permanent Error) | 2 |
| Call Barred by Operator (Permanent Error) | 1 |
| Memory Capacity Exceeded | 20 |
| Absent Subscriber - IMSI Detached | 64 |
| Absent Subscriber - Paging Failure | 3 |
| System Failure | 9 |
| Error in MS | 1 |

So 3% of MT delivery attempts fail with permanent errors and the SM should be discarded by the router 104 or the gateway 102 rather than forwarded to an SMSC 103. Of the SM forwarded 84% failed their original delivery attempt for reasons that will cause an immediate retry by the SMSC 103 to terminate with an error indication from the HLR. However this retry/delivery attempt must be made in order to register the SMSC 103 in the MWD of the HLR. The remaining 13% of failures are errors that if delivery is immediately retried will result in both a sendRoutingInfoForSM operation and a mt-ForwardSM operation being sent. In many of these cases this immediate retry will probably succeed.

Congestion Management

In a heavily loaded network both routers 104 and gateways 102 need to direct traffic to those delivery & storage systems that still have capacity to spare. Although SS7 adequately handles the situation where a system has reached capacity it does not provide adequate facilities to allow one application to signal its load state to another system. Standard SMPP v3.4 has no overload handling mechanism.

Multiple Parallel Deliveries

Mobile networks generally do not allow the delivery of multiple short messages to an MS in parallel. One of the problems that a router based load sharing architecture introduces is that SM for a single MS can end up on multiple SMSC 103. If the SMSC 103 all register with the HLR to receive alerts then when the MS becomes available all of the SMSC 103 attempt delivery to it at the same time. This typically results in one SMSC 103 succeeding and the others all receiving error indications.

Routing of Commands and Network Alerts

The dynamic load sharing of messages between multiple SMSC 103 creates difficulties for routers 104 and gateways 102 when they need to send delete, query or update commands for an SM to the SMSC 103 holding the message.

Addressing the problem of superfluous deliveries discussed above can result in the router 104 having difficulty knowing which of multiple SMSC 103 it needs to trigger delivery from when it receives an alert from the network.

Charging

Many networks charge pre-pay subscribers for their MO SM in real-time before the first attempt is made to deliver the SM. However if the first delivery attempt fails and the SM is forwarded to the SMSC 103 which also fails to deliver it then it may be necessary for the SMSC 103 to issue a refund. Some pre-pay systems may require the reference of the original charge in order to issue the refund. Current router 104 implementations do not convey this information to SMSC 103. Also in some networks it may be desirable to pass messages that cannot be charged for immediately to the SMSC 103 to store until such time as the charge can be successfully made (e.g. temporary unavailability of the charging system). In this case the SMSC 103 needs to be able to discriminate between those SM that have been charged for and those that have not.

Many networks charge for reverse charge SM from applications to mobiles in real-time just before they are delivered. If an SM cannot be charged for then the delivery attempt must be aborted and the SM sent to an SMSC 103 for storage and delivery at a later date. If the SMSC 103 is going to make deliveries directly then it needs to know which messages have been charged for and which have not. Current router 104 implementations do not convey this information to SMSC.

Status Reports

Most routers 104 that have the capability to deliver SM are also capable of generating SR to report the outcome of a delivery attempt. If the original SM submitter is no longer reachable at that point then the SR must either be discarded or the router 104 must save it and retry delivering it later. Neither of these options is desirable.

Most gateways 102 do not currently generate SR. They leave this to the SMSC 103 that is delivering through them. However in theory future gateways 102 could generate SR and in this case they will also need the capability to forward SR that they cannot deliver to SMSC 103.

Virtual Mobile Handling

There are many implementations of the concept of attaching a fixed network application to a mobile network as if it were a mobile. This is generally achieved by adding a device to the SS7 network that emulates an MSC that is supporting a population of "mobiles" that are actually fixed network devices.

FIG. 2 is a schematic representation of message flow sequence 200 in an exemplary virtual mobile service. When the Virtual Mobile feature is used in a router the fact that the original SM was a virtual mobile SM is lost when the SM is forwarded to an SMSC. This means that the SM arrives at the SMSC as if it was a normal MO SM and will almost certainly be rejected by either the MSISDN or IMSI barring checks in the SMSC (because the SM was originated by the subscriber of another network).

The originating SMSC 204 has accepted an SM and is attempting to deliver it to a fixed network application 203 that is masquerading as a Mobile Station.

1. The originating SMSC 204 sends the SM over SS7/SIGTRAN 207 to a router 202 that is emulating and MSC over the mobile network backbone. Typically this will involve the originating SMSC 204 first obtaining the address of the router 202 by interrogating a real (or simulated) HLR (not illustrated). Then the message is sent 207 to the router 202. This usually means exiting the home network of the originating SMSC 204 through one gateway switch and entering the destination network through another (not illustrated).
2. The router 202 attempts to deliver 206 (either directly or via a gateway 208) the SM to the application 203, but is unsuccessful.
3. The router 202 forwards 205 the SM to another SMSC 201 that for storage and delivery at a later date. The router 202 acknowledges receipt of the message to the originating SMSC 204. This step is typically fails as the router 202 fails to inform the SMSC 201 that the SM is a virtual mobile message rather than a normal message and the SMSC 201 rejects it. If the SMSC 201 accepts the SM the SMSC 201 will subsequently attempt to deliver 209 it (either directly or via a gateway 208) to the application emulating an MS 203.

An alternative implementation is for the router 202 to return an error to the originating SMSC 204 if the delivery attempt to the application (see reference [2]) is unsuccessful. This puts the onus for retrying delivery on the originating SMSC 204. This latter solution puts more load on the network and particularly on the inter-network gateway and the HLR.

Replies

Referring again to FIG. 1, the router 104 keeps track of those SM that it has delivered and that specified that a reply was allowed via the router 104 (for example, in a GSM SMS this is done by setting the TP-REPLY-PATH field) and so do the SMSC 103 for the SM that they handle. This means that when a reply is sent back to the SMSC 103 or router 104 that delivered the original message special handling can be invoked to ensure that the reply is accepted. If the router 104 fails to deliver the reply it must forward it to the SMSC 103. However the SMSC 103 will not recognize the SM as a reply (if it did not handle the original SM) and will reject it.

Concatenated SM Handling

Problems can arise when the router 104 attempts to deliver concatenated SM. If for example the first part (i.e. part 1) is successfully delivered by the router 104, but part 2 cannot be delivered then part 2 is sent to the SMSC 103. If part 3 then arrives at the router 104 and is delivered by the router 104, part 3 may arrive at the MS before part 2. Typically this happens because the router 104 drops the dialogue to the MS after part 1, and part 2 fails because the MSC is still in the process of tearing down the air channel when part 2 arrives.

SUMMARY OF INVENTION

A method of processing a message in a short message service in which a router or alternatively a gateway makes a first attempt to deliver the message, the deliver attempt failing the router or gateway sends the message and other supporting information to a service center that can store the message and re-attempt delivery of the message. The supporting information provided by the router or gateway enables the service center to process the message in an efficient manner. The supporting information can include a failure type indicator, a charge indicator, a charge reference number, a virtual mobile indicator and a reply indicator.

An exemplary embodiments can provide a method for processing a message in a short message service having a router connected to a mobile communication network adapted to receiving and forwarding the message, a gateway connected to a fixed communication network adapted to receiving and forwarding the message, and a service center adapted to receiving, storing and forwarding the message, each of the router, gateway and service center being inter-connected for forwarding and receiving the message, the method comprising the steps of: receiving the message at one of the router and the gateway from a sender via one of the mobile communication network and the fixed communication network respectively; attempting to deliver the message to a recipient responsive to which of the mobile telephone network and the fixed communication network the recipient is located in; forwarding the message and a failure type indicator from the from the one of the router and the gateway that received the message to the service center, when the attempt to deliver the message to the recipient fails; receiving the message and the failure type indicator at the service center; storing the message and scheduling an attempt to deliver the message to the recipient at a retry time responsive to the failure type indicator; and attempting to deliver the message from the service center to the recipient via one of the router and the gateway, responsive to which of the mobile telephone network and the fixed communication network the recipient is located in, when the retry time is reached.

Another exemplary embodiments can provide a method for processing a message in a message service having a router connected to a mobile communication network adapted to receiving and forwarding the message, a gateway connected to a fixed communication network adapted to receiving and forwarding the message, and a plurality of service centers each adapted to receiving, storing and forwarding the message, each of the router, gateway and service center being inter-connected for forwarding and receiving the message, the method comprising the steps of: arranging each one of the plurality of service centers into one of a plurality of service center groups; receiving the message at the router from a sender via the mobile communication network; attempting to deliver the message from the router to a recipient responsive to which of the mobile telephone network and the fixed communication network the recipient is located in; selecting one group from the plurality of service centers groups based on a pre-determined set of rules; identifying one of the service centers within the select group based on applying a hash algorithm to one of a destination address of the message and an originating address of the message, the hash algorithm being biased to identifying a service center in the selected group having greater capacity relative to the other service centers in the group; and forwarding the message and a failure type indicator from the router to the identified service center when the attempt to deliver the message to the recipient fails.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which.

DETAILED DESCRIPTION

Figure 1:
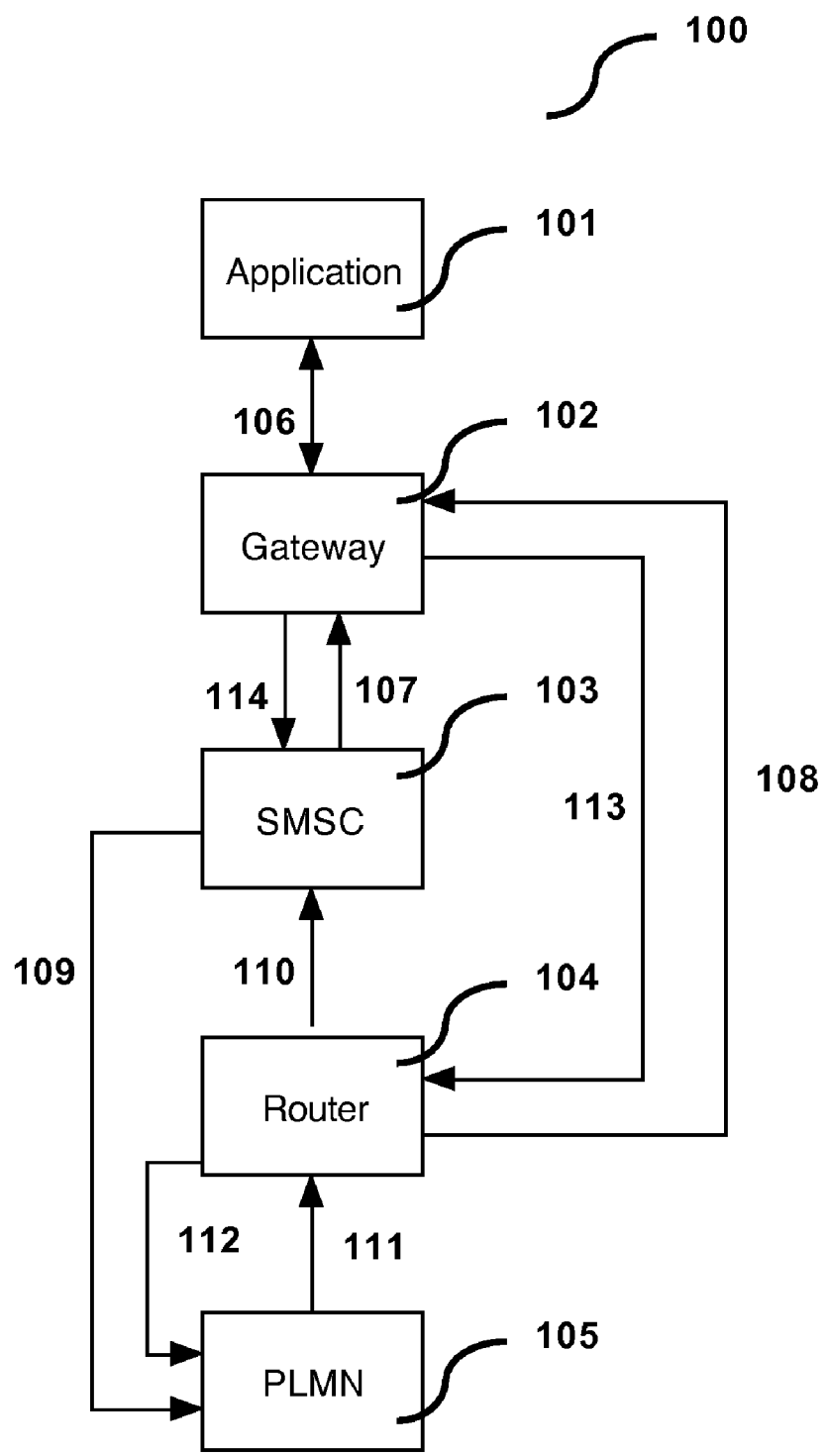
FIG. 1 is a schematic representation of an exemplary SMS architecture.
Figure 2:
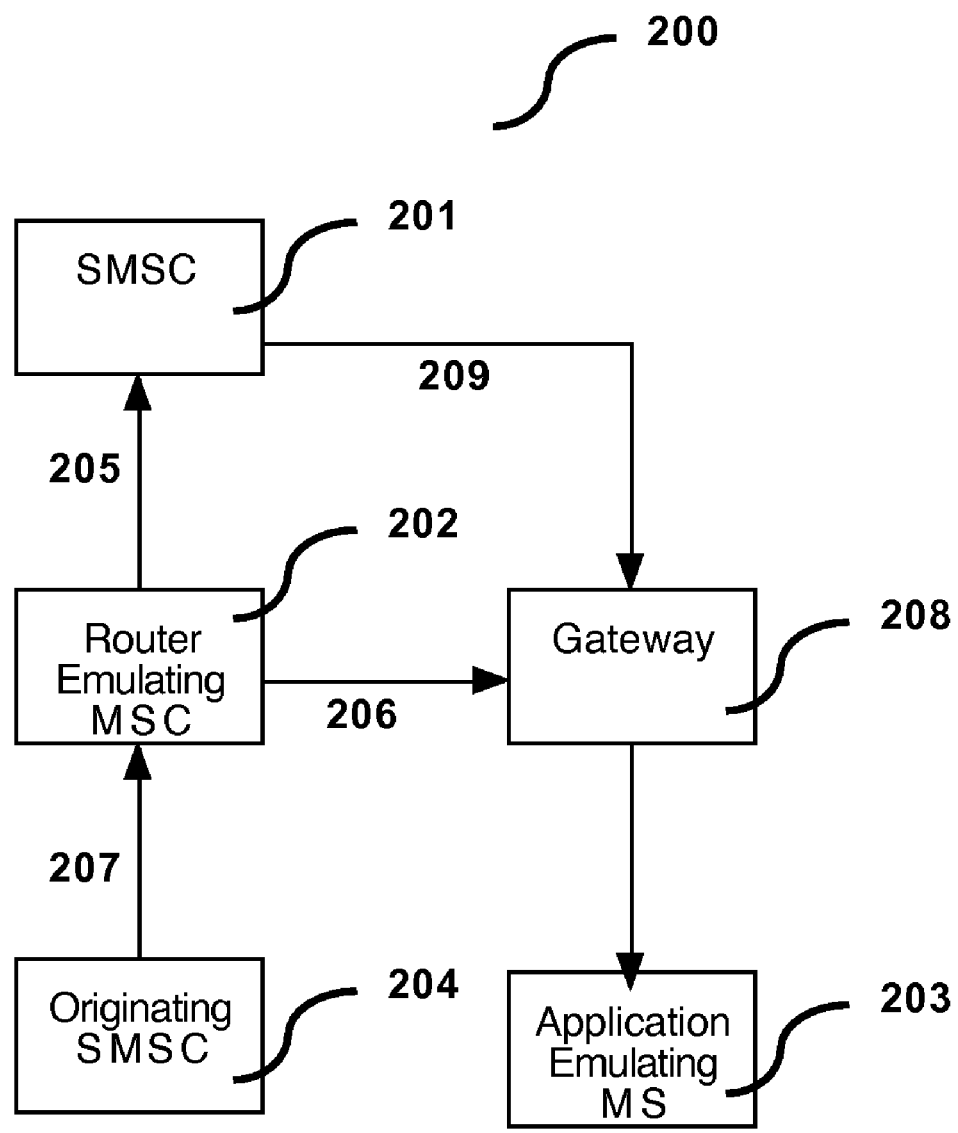
FIG. 2 is a schematic representation of message flow sequence in an exemplary virtual mobile service.
Figure 3:
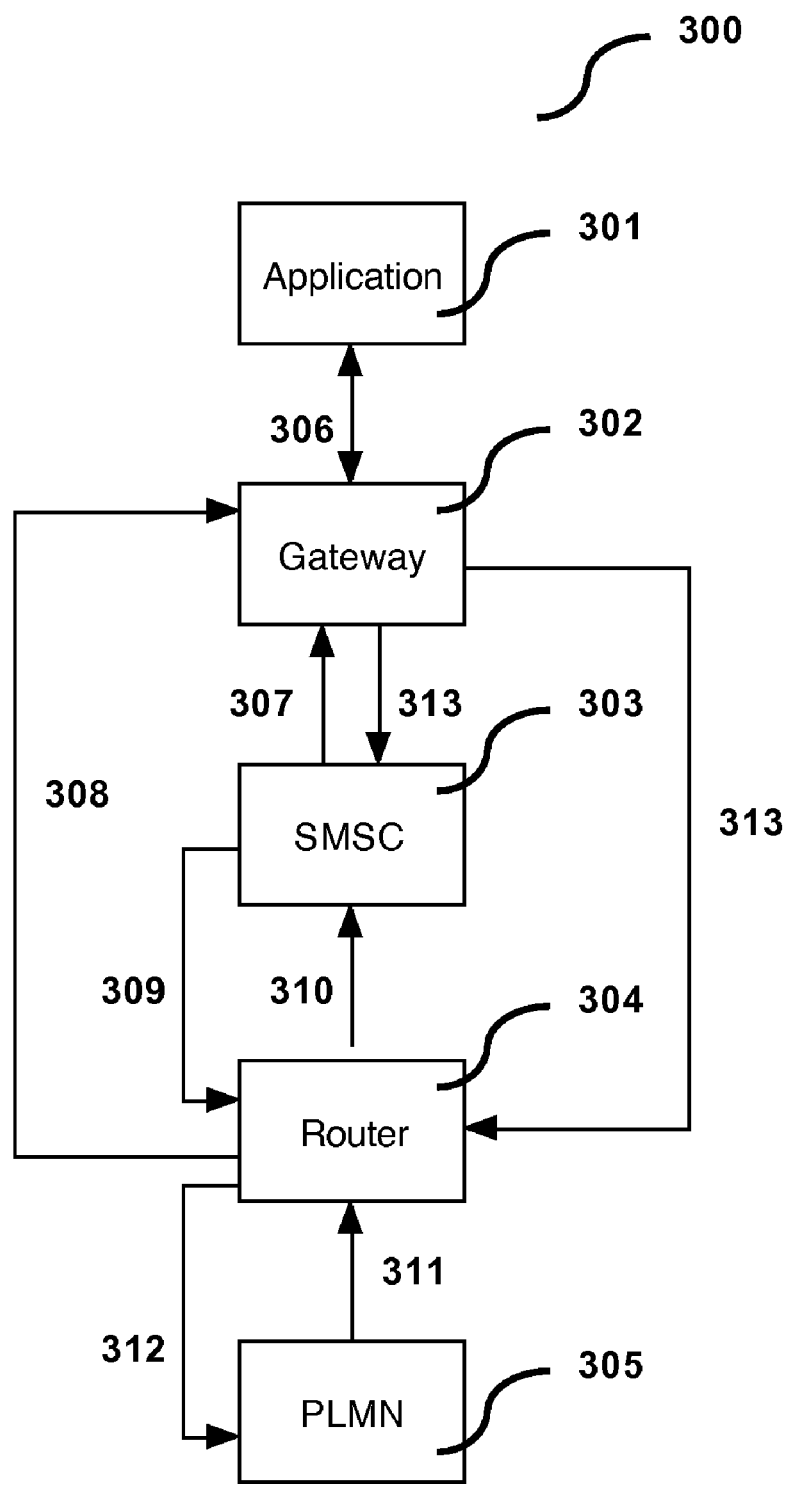
FIG. 3 is a schematic representation of an exemplary messaging architecture and message flows therein.

FIG. 3 is a schematic representation of an exemplary messaging architecture 300 and message flows therein in accordance with the present method for processing a message. The messaging architecture 300 is described in the context of a SMS but is equally applicable to a MMS and other similar messaging services.

The messaging architecture 300 is comprised of one or more gateways 302, one or more message centers (a.k.a. SMSC) 303 and one or more routers 304. The one or more gateways 302 allow applications 301 hosted in a fixed communication network (herein after a fixed network) to gain access to the SMSC 303 and routers 304. The one or more SMSC 303 store messages (SM & SR) and forward them to their intended recipients via the gateways 302 and routers 304. The one or more routers 304 collect messages 311 from a mobile communication network (herein after a mobile network) (a.k.a. PLMN) 305 and either deliver them to other mobiles (i.e. mobile terminals), forward them 310 to a SMSC 303 or deliver them 308 to fixed network applications 301 via gateways 302. Each of these elements are described in more detail below.

In a preferred embodiment the protocol for connecting together the SMSC 303, routers 304 and gateways 302 is SMPP (see reference [3]) with extensions to convey additional information about the status of the message and the network elements.

Gateway

Each of the one or more gateways 302 is a protocol converter, delivery engine and Policy Enforcement Point. The gateway 302 can also be responsible for access control and some fraud prevention functionality.

The gateway 302 can control access to the messaging system from the fixed network. It can ensure that connections are only permitted from authorized external systems. The gateway 302 can protect the rest of the messaging system from fixed network originated floods and service denial attacks. The gateway 302 can protect itself from overload and denial of service attacks. The gateway can enforce operator policies about permitted throughput, quality of service, access to facilities and services. The gateway 302 can interact with an external PDP using COPS (or an equivalent protocol) to obtain mobile subscriber access policy information and enforce it (opt in, opt out, personal barring lists, adult content control etc.). The gateway 302 can determine the quality of service for the message. The gateway 302 can perform any necessary multi-destination fan out. The gateway 302 can route FO requests 313 to a suitable router 304 (e.g. having the correct network protocol and not currently overloaded), and if the delivery attempt fails take suitable action such as forwarding the message 313 to an SMSC or trying a last resort delivery mechanism (e.g. another gateway 302 or another router 304). The gateway 302 can accept messages (including status reports and alert notifications) from other gateways 302, routers 304 and SMSC 303 and attempt delivery. Reporting back accurately the reason for delivery failure. The gateway 302 can optionally supplement the data content of delivered messages with data from an external data source (e.g. location). The gateway 302 can optionally write a copy of every message submitted to a data warehouse to comply with prevention of terrorism legislation. The gateway 302 can receive requests for delivery 306 from fixed network applications 301 and obtain the requested messages 307 from the SMSC 303. The gateway 302 can receive message management requests (e.g. Delete, Update, and Replace) from fixed network applications and route them to the SMSC 303 holding the target messages. The gateway 302 can generate billing data. The gateway 302 can forward requests to access SS7 databases to appropriate routers and relay the results back to the requester. For example the Airwide Solutions Inc. Open Interface Specification (OIS) protocol supports an operation that allows a fixed network application 301 to request an SMSC 303 to obtain the International Mobile Subscriber Identity (IMSI) and location of an MS and return it to the application.

The gateway 302 can generate SR to report delivery of SM that were both submitted and delivered through it (e.g. in the case of a FO-FT (a.k.a. application to application) SM) and forward the SR to an SMSC 303 if the gateway 302 fails to deliver the SR.

SMSC

Each of the one or more SMSC 303 holds messages that have failed to be delivered, schedules retries for them and pushes 309, 307 them to a suitable router 304 or gateway 302 when a retry is due. The SMSC 303 handles all deferred delivery messages, and message expiry. The SMSC 303 does not have either a direct connection to the mobile network 305 or to the fixed network applications 301. In an alternative embodiment the SMSC 303 receives messages 311 from the mobile network 305 via one or more routers 304 and can send messages to the mobile network 305 directly.

The SMSC 303 can accept messages from routers 304 and gateways 302 and store them. Storage may require a specific protocol conversion to place the messages in a centralized storage area network (SAN) or other similar mass storage device. The SMSC 303 can receive message management requests from gateways 302 and routers 304 and apply them to messages. The SMSC 303 can schedule retries for stored messages. The SMSC 303 can, when retries fall due, send the appropriate message(s) to a suitable gateway 302 or router 304 for delivery (taking into account both protocols and congestion levels). The SMSC 303 can manage network restrictions on delivery (e.g. GSM does not permit multiple deliveries in parallel to a single address (MS) but SMPP does). The SMSC 303 can check messages for expiry before forwarding them and if expired raise appropriate billing events, Pre-Pay refunds and create SR as required. SR can be forwarded to a router or alternatively to a gateway 302 for delivery. The SMSC 303 can forward messages to routers 304 on demand. The SMSC 303 can protect itself from overload.

Router

The router 304 is responsible for accepting messages from the mobile network 305, refusing submission of fraudulent messages, pre-pay checking messages and enforcing subscriber and operator content policies.

The router 304 can accept messages 311 (both normal and virtual mobile) from the mobile network 305 and validate them. The router 304 can enforce network operator content policies (e.g. restrict UDH and Port settings). The router 304 can prevent fraudulent access (e.g. check MSISDN/IMSI, verify location etc). The router 304 can interact with an external Policy Definition Point using COPS (or an equivalent protocol) to obtain mobile subscriber access policy information and enforce it (opt in, opt out, personal barring lists, adult content control etc.). The router 304 can determine the quality of service for the message. The router 304 can credit check & charge for MO SM that need real-time charging. The router 304 can credit check & reverse charge for MT SM that need real-time charging. The router 304 can attempt first delivery 308 of MO-MT messages where appropriate, and if the delivery attempt fails take suitable action. For example forward the message to an SMSC or try a last resort delivery mechanism (such as, for example, a gateway 302 or another router). The router 304 can route MO-FT messages 308 to a suitable gateway 302 (e.g. having the correct network protocol and not currently overloaded), and if the delivery attempt fails take suitable action (e.g. forward the message to storage or try a last resort delivery mechanism, such as, for example, a gateway 302 or another router). For cross network (e.g. GSM to IS41) messaging the router 304 can forward a message to another router. The router 304 can accept messages 313 from gateways 302, other routers and SMSC 303 and attempt delivery. Reporting back accurately the reason for delivery failure. The router 304 can optionally write a copy of every message submitted to a data warehouse to comply with local legislation. The router 304 can receive alerts for delivery from HLR and pull the requested messages from the SMSC 303. The router 304 can receive message management requests (e.g. Delete, Update, and Replace) from the mobile network 305 and route them to the SMSC 303 holding the target messages. The router 304 can generate billing data. The router 304 can support Virtual Mobile applications. The router 304 can protect itself from overload.

When a router 304 dynamically distributes traffic between multiple SMSC 303 there are a number of issues that need to be considered. The GSM SMS Standards recognize that SMS is a store-and-forward service and that the submitter of an SM may want to cancel, enquire on or change SM that they have previously sent. These operations use the SMS-COMMAND TPDU conveyed in a MAP ForwardSM message. To support these operations the router 304 must know where it has sent the SM so that it can send the command to the same place. The GSM SMS supports concatenated SM—that is a single logical message such as a WAP datagram, SIM Programming command, or EMS message conveyed in multiple SM. To ensure that all parts of the message are delivered in the correct order they must all be routed via the same SMSC. If multiple SMSC 303 can all hold SM for delivery to the same destination address there will be increased congestion on the PLMN 305—when the MS registers with the network all of the SMSC 303 with messages queued will try to deliver simultaneously.

Router or Gateway Sends Error Indication to SMSC

The router 304 or gateway 302 forwards 310, 313 to the SMSC 303 details of the outcome of any delivery attempt it has made for an SM. The router 304 can do this in an optional private extension (as is allowed for example in GSM MAP) to the mo-ForwardSM operation at MAP level or alternatively in a vendor specific optional parameter to the SMPP SUB-MIT_SM and DATA_SM operation (see section Changes to Existing SMPP Operations below). The gateway 302 can use a vendor specific optional parameter to the SMPP SUB-MIT_SM operation. When the MAP protocol is used the extension is always sent, its presence allows the SMSC 303 to deduce that the SM has come via a router 304 and not directly from a mobile. When the SMSC 303 receives an SM with the private extension omitted the SMSC 303 knows that no delivery attempt has been made for the SM and it can make an immediate delivery attempt. When SMPP is used the presence of the vendor specific optional parameter does not need to be used to infer that the SM has come via a router 304 or gateway 302 as SMPP is connection orientated and the SMSC 303 can always tell the source of the SM from the connection it arrives on. Alternatively, the above description with respect to a vendor specific optional parameter in the SMPP SUBMIT_SM operation applies equally to the SMPP DATA_SM operation.

In an alternative embodiment, the router 304 can forward to the SMSC 303 details of the outcome of any delivery attempt it has made for an SM using a private extension to the Short Message Delivery Point-to-Point operation of the ANSI-41 MAP protocol.

When the SMSC 303 receives 310, 313 an SM via a router 304 or gateway 302 the action it takes will depend both on the quality of service assigned to the SM and contents of the private extension. If no delivery attempt has been made by the router 304 or gateway 302 then the SMSC 303 makes an immediate attempt to deliver the SM. If the quality of service assigned to the SM only permits a single delivery attempt to be made then this is made immediately regardless of the contents/presence of the private extension. If a delivery attempt has been made by the router 304 or gateway 302 and the type of failure reported indicates a local problem in the router or gateway (e.g. congestion in the router) then the SMSC 303 makes an immediate attempt to deliver the SM. If a delivery attempt has been made by the router 304 or gateway 302 and this failed with an error indication from the mobile network 305 (in the case of messages from the gateway this represents the case where the gateway 302 has made an initial delivery attempt via a router 304 and this delivery attempt has failed, the gateway 302 then forwards the message to an SMSC 303) and the quality of service assigned to the SM requires the SM to be stored then it is. In addition, when the SMSC 303 has no other messages queued for the destination of the SM and the router delivery attempt failed with "Absent Subscriber" or "SIM Card Full" (or its CDMA, TDMA or other protocol equivalent), then the SMSC 303 queues a retry for the destination on a retry schedule configured for that error. When the SMSC 303 has messages queued for the destination and either the router 304 or gateway 302 delivery attempt failed with "Absent Subscriber" or "SIM Card Full" (or its CDMA, TDMA or other protocol equivalent), then SMSC 303 uses the information passed by the router 304 or gateway 302 and the status of the destination (as known to the SMSC 303) to determine what to do next. An existing retry timer can be allowed to run. If no retry timer is running then the destination can be assumed to be waiting on an alert from the HLR that the SMSC 303 requested at some time in the past (either directly if the SMSC 303 has SS7or SIGTRAN connection to the mobile network 305, or via the router 304 if it does not). It is possible that the SMSC 303 could be restarting and has not yet queued a retry for this destination yet, but in this case the normal restart procedures can be allowed to run their course. When the router 304 or gateway 302 delivery attempt failed with an error other than "Absent Subscriber" or "SIM Card Full" (or their CDMA, TDMA or other protocol equivalents), then the SMSC 303 does not attempt to deliver the SM and terminates the delivery cycle. If there are already messages queued for the destination then the SMSC 303 uses the information passed by the router and the status of the destination (as known to the SMSC 303) to determine what to do next. If there is an existing retry timer then it can be allowed to run. If there are no messages already queued for the destination then the SMSC 303 uses the information passed by the router or gateway to queue a retry for the new destination.

Router Forwards Network Alerts to the SMSC

If a delivery attempt by a router 304 fails because the destination MS is switched off, out of coverage, or has insufficient capacity to store the message ("Absent Subscriber" or "SIM Card Full") then the address supplied by the router 304 in the GSM MAP serviceCentreAddress parameter of the sendRoutingInfoForSM operation is stored in the HLR and is used by the HLR as the destination global title for an AlertServiceCentre operation when the MS becomes reachable again. Equivalent functionality exists in other well known mobile network standards.

In the present method of processing a message the router 304 triggers delivery from the SMSC 303 that hold messages for the relevant address when the AlertServiceCentre arrives from the HLR. This operation has no equivalent in standard SMPP v3.4. In accordance with the present invention an SMPP operation for this purpose called "DELIVERY_REQUEST" is described below.

Similarly the gateway can use "DELIVERY_REQUEST" to trigger delivery for application terminated messages when an application connects to the gateway.

To ensure optimal use of network resources all SM for a single MS should be localized in a single SMSC 303. This preserves message sequence and prevents conflicts when the MS becomes available and multiple SMSC 303 all attempt to deliver to it in parallel. However the need to load share traffic between multiple SMSC 303 and failures and planned maintenance mean that in practice this policy cannot be adhered to 100%. Therefore from time to time the messages for a single destination will be found on more than one SMSC 303. When the MS registers on the network the HLR will send the router layer an alert. If the router layer is well designed only one should be necessary. The router layer is now responsible for triggering delivery from all of the SMSC 303 that have messages queued for the MS. This could be done by keeping track of where all of the messages are in a database of some sort, but this is inefficient and error prone. Our proposed solution is for the alerts to be routed to the SMSC 303 nominated as the primary SMSC 303 for traffic for that MS and also to a designated secondary SMSC 303 (after a short delay to avoid conflicts). This is fairly efficient and will work in the majority of cases. However occasionally where there have been multiple failures or a combination of failure and network reconfiguration this approach can result in SM being isolated on SMSC 303 that will not receive alerts. This situation is handled by having a second set of retry schedules in the SMSC 303—for SM that the SMSC 303 knows it is unlikely to receive an alert for.

Extensions to SMPP v3.4—New Operations

The following describes exemplary extensions (i.e. optional parameters) that can be made to the SMPP v3.4 protocol definition in accordance with the present method of processing a message.

"DELIVERY_REQUEST" Operation

The delivery_request operation is used by an ESME (e.g. fixed network application 301) to trigger the delivery of messages stored for it in the SMSC 303. For example an ESME could use this operation to restart the delivery of messages by the SMSC 303 after the ESME has rejected deliveries from the SMSC 303 with a CONGESTION indication.

| SMPP PDU Name | Required SMPP Session State | Issued by ESME | Issued by SMSC |
| --- | --- | --- | --- |
| DELIVERY_REQUEST | BOUND_RX BOUND_TRX | Yes | No |

The following is the format of the SMPP delivery_request PDU. The command_id field contains the command identifier code for delivery_request.

| | Field Name | Size octets | Type | Description |
|---|---|---|---|---|
| HEADER | command_length | 4 | Integer | Set to overall length of PDU. |
| | command_id | 4 | Integer | delivery_request |
| | command_status | 4 | Integer | Not used. Set to NULL. |
| | sequence_number | 4 | Integer | Set to a unique sequence number. The associated delivery_request_resp PDU will echo the same sequence number. |
| MANDATORY PARAMETERS | source_addr_ton | 1 | Integer | Type of Number for source_addr. If not known, set to NULL (Unknown). |
| | source_addr_npi | 1 | Integer | Numbering Plan Indicator for source_addr. If not known, set to NULL (Unknown). |
| | source_addr | Var. max 21 | C-Octet String | The address for which message delivery is required. This address can either be an exact address specification or it can be a prefix terminated by an * character where the * stands for any number of characters of any value. |
| | additional_address | — | TLV | Additional source addresses for which delivery is required. This TLV can occur multiple times up to a maximum of 255 times. |
| | additional_status_info_text | — | TLV | This parameter is only sent from a router connected to a ANSI-41 network. This parameter is used to signal changes to the setting of the Delivery Pending Flag in the home HLR for the MS for which this operation was generated. |
| | esn | — | TLV | This parameter is only sent from a router connected to an ANSI-41 network. It contains the ESN of the MS for which delivery is required. |
| | sms_address | — | TLV | This parameter is only sent from a router connected to an ANSI-41 network. It is the network address of the MSC that is currently handling the MS for which delivery is required. |
| | teleservice_code | — | TLV | This parameter is only sent from a router connected to an ANSI-41 network. It is optional on ANSI-41 networks. If available it is the Teleservice for which delivery is required. If not present then delivery is required for all teleservices. |
| | transaction_capability | — | TLV | This parameter is only sent from a router connected to an ANSI-41 network. It is a bit map describing the capabilities of the MSC currently handling the MS for which delivery is required. |

"DELIVERY_REQUEST_RESP" Operation

The delivery_request_resp is the response to the delivery_request PDU and has the following format:

|  | Field Name | Size octets | Type | Description |
|---|---|---|---|---|
| HEADER | command_length | 4 | Integer | Set to overall length of PDU. |
|  | command_id | 4 | Integer | delivery_request_resp |
|  | command_status | 4 | Integer | Indicates the outcome of the delivery_request request. |
|  | sequence_number | 4 | Integer | Set to the sequence number of original delivery_request PDU. |
| BODY | messages_queued | 1 | Integer | If there are any undelivered messages queued in the SMSC for source_addr then this field is set to 0x01. If there are no undelivered messages queued for source_addr then it is set to 0x00. If the SMSC does not support this feature, or the number of messages queued is unknown then this field is set to 0xFF. |
| OPTIONAL PARAMETERS | congestion_state | — | TLV | This is used by the SMSC to signal its congestion state back to the ESME and by the ESME to signal its congestion_state to the SMSC. |

"INTERROGATE_HLR" Operation

The interrogate_HLR operation is used to cause the SMSC 303 to interrogate the home HLR of a mobile station and return information about the location of that mobile station.

| SMPP PDU Name | Required SMPP Session State | Issued by ESME | Issued by SMSC |
|---|---|---|---|
| INTERROGATE_HLR | BOUND_TX BOUND_TRX | Yes | No |

Following is the format of the SMPP interrogate_HLR PDU. The command_id field contains the command identifier code for interrogate_HLR.

|  | Field Name | Size octets | Type | Description |
|---|---|---|---|---|
| HEADER | command_length | 4 | Integer | Set to overall length of PDU. |
|  | command_id | 4 | Integer | interrogate_HLR |
|  | command_status | 4 | Integer | Not used. Set to NULL. |
|  | sequence_number | 4 | Integer | Set to a unique sequence number. The associated interrogate_HLR_resp PDU will echo the same sequence number. |
| MANDATORY PARAMETERS | source_addr_ton | 1 | Integer | Type of Number for source_addr. If not known, set to NULL (Unknown). |
|  | source_addr_npi | 1 | Integer | Numbering Plan Indicator for source_addr. If not known, set to NULL (Unknown). |
|  | source_addr | Var. max 21 | C-Octet String | Address of ESME that originated this message. If not known, set to NULL (Unknown). |
|  | dest_addr_ton | 1 | Integer | Type of Number for destination_addr. If not known, set to NULL (Unknown). |
|  | dest_addr_npi | 1 | Integer | Numbering Plan Indicator for destination_addr. If not known, set to NULL (Unknown). |
|  | destination_addr | Var. max 21 | C-Octet String | Address of the mobile station that the submitter wants information about. |

"INTERROGATE_HLR_RESP" Syntax

This is the response to the interrogate_HLR PDU and has the following format:

|  | Field Name | Size octets | Type | Description |
|---|---|---|---|---|
| HEADER | command_length | 4 | Integer | Set to overall length of PDU. |
|  | command_id | 4 | Integer | interrogate_HLR_resp |
|  | command_status | 4 | Integer | Indicates the outcome of the interrogate_HLR request. |
|  | sequence_number | 4 | Integer | Set to the sequence number of original interrogate_HLR PDU. |
| BODY | first_network_node_ton | 1 | Integer | Type of Number for first_network_node_addr. If not known, set to NULL (Unknown). |
|  | first_network_node_npi | 1 | Integer | Numbering Plan Indicator for first_network_node_addr. If not known, set to NULL (Unknown). |

| Field Name | Size octets | Type | Description |
| --- | --- | --- | --- |
| first_network_node_addr | Var. max 21 | C-Octet String | Address of the network node currently handling the mobile station. If the network supports both GPRS and GSM CSD then the first_network_node_addr relates to the GSM MSC and the second_network_node_addr relates to the GPRS SGSN. If not known, set to NULL (Unknown). |
| second_network_node_ton | 1 | Integer | Type of Number for second_network_node_addr. If not known, set to NULL (Unknown). |
| second_network_node_npi | 1 | Integer | Numbering Plan Indicator for second_network_node_addr. If not known, set to NULL (Unknown). |
| second_network_node_addr | Var. max 21 | C-Octet String | Address of the network node currently handling the mobile station. If the network supports both GPRS and GSM CSD then the first_network_node_addr relates to the GSM MSC and the second_network_node_addr relates to the GPRS SGSN. If not known, set to NULL (Unknown). |
| esn | Var. max 16 | C-Octet String | The ESN of the mobile station. If not known or not applicable set to NULL (Unknown). |
| imsi | Var. max 16 | C-Octet String | The IMSI of the mobile station. If not known or not applicable set to NULL (Unknown). |
| congestion_state | — | TLV | This is used by the SMSC to signal its congestion state back to the ESME and by the ESME to signal its congestion_state to the SMSC. |

Congestion Management

Adoption of SMPP v5 (see reference [4]) as the protocol to connect the various elements of the SMS or the adoption of SMPP v3.4 (see reference [3]) extended to use the SMPP v5 congestion_state TLV provides an adequate mechanism for the various systems implementing the SMS to pass congestion state information between them. Other protocols can be used, that provide an equivalent facility.

The congestion_state TLV parameter can be sent by every component of the SMS in every result it sends. The setting of the congestion_state TLV parameter can be driven by some measure of the load to which the component is exposed.

MO-MT Traffic

Most MO-MT traffic is handled locally by the router 304. This is the most efficient way of handling this traffic. Only undeliverable messages and messages requiring special handling are passed on to the SMSC 303. When congestion for MO-MT traffic occurs it is most probable that it will be due to capacity problems in the radio network. The present method of processing a message for MO-MT traffic provides for passing messages that the router 304 cannot deliver to the SMSC 303 for storage until conditions for delivery are more favorable. When the SMSC 303 start to become congested they signal their congestion levels back to the routers 304. The routers 304 then re-evaluate their load balancing algorithm to redistribute traffic so as to more heavily load those SMSC 303 that have the most capacity remaining. When all of the system capacity is in use the routers 304 and SMSC 303 will invoke their overload functionality and start to reject traffic.

In an exemplary embodiment of the present method for processing a message, CPU utilization can be used as an indicator of system occupancy.

Network operators may want to keep the load on their SMSC 303 artificially low to ensure that it can survive partial failure without loss of service, so the mapping of resource usage to congestion-state needs to be flexible. The SMPP v5.0 standard identifies 7 bands of values for congestion_state. These are:

Idle (0);
Low Load (15);
Medium Load (40);
High Load (65);
Optimum Load (85);
Nearing Congestion (95);
Congested (100).

So for example for a fully redundant (e.g. two node) configuration not planned to ever run at greater than 80% CPU utilization on a single node the SMSC 303 should report congestion_state=100 when CPU utilization across the SMSC 303 cluster attains 40%. The percentages must be of the whole cluster resources, the system must adapt to cluster transitions. I.e. 40% of a two node cluster becomes 80% of the surviving node after a first failure.

The approach illustrated in this example assumes that the operator wants to avoid the problems associated with true dynamic load sharing, as described above, most of the time, but is prepared to accept them at peak times.

SMSC 303 are organized into groups. Each SMSC 303 has a capacity associated with it. Traffic is directed by rules set in the router 304 to groups of SMSC 303 and within a group a hash algorithm (using the destination address of the SM as the input to the algorithm) is used to assign messages to specific SMSC 303. The hash algorithm can, for example, use as input the destination address of the SM when the message is MO or alternatively the originating address can be used as input when the message is FT. The hash algorithm is re-evaluated each time the group configuration is changed, but as long as the configuration is stable all messages to a single destination address will be sent to a single SMSC 303—resolving the issues raised in the Router section of this document. Preferably the hash distribution is kept as stable as possible. As the congestion_state value of 85% is considered to be optimum loading no action is taken until this value is exceeded. If an SMSC 303 reports a congestion_state greater than 90% then for each percentage point the value is above 90% its capacity for the purposes of the hash calculation can be reduced by 10%. Some means of recovering from the situation where an SMSC 303 is fully congested (and therefore has 0 capacity) is needed. A solution is for the router to regularly send SMPP ENQUIRE_LINK to each fully congested SMSC 303. The ENQUIRE_LINK_RESP can contain congestion state and thus notify the router when the SMSC 303 congestion drops to acceptable levels.

Multi-part messages need special handling. Once a route (i.e. a SMSC 303) has been chosen for the first part of a concatenated message then preferably all of the other parts of this concatenated message should follow the same route. This rule should only be broken if the route (i.e. a SMSC 303) followed by the first SM of the concatenated message fails.

MO-FT Traffic

Most MO-FT traffic is handled by the router 304 and the gateway 302. The router 304 passes the messages directly to the gateway 302 which delivers them to the applications. Only undeliverable messages and messages requiring special handling are passed to the SMSC 303. The forwarding to the SMSC 303 can be performed either by the router 304 or the gateway 302, the preferred implementation is for the forwarding to the SMSC 303 to be done by the router 304. When the applications cannot keep up some messages will be diverted to the SMSC 303 (determined by the quality of service assigned to the SM). Messages with single-shot quality of service are discarded, the rest are forwarded. SMSC 303 congestion is handled as described above. Gateways 302 signal congestion to the router 304 and the router 304 loadshares traffic between those gateways 302 with connections to the destination application according to the capacity of the gateway 302. When all of the system capacity is in use the routers and SMSC 303 will invoke their overload functionality and start to reject traffic.

FO Traffic

When congestion occurs a number of mechanisms can be brought into play to manage FO traffic. Gateways 302 can monitor SMSC 303 and router 304 congestion and can adapt their load sharing algorithms to reduce the load on more heavily congested SMSC 303 and routers 304. A similar technique to that used by the routers 304 for MO traffic can be used. SMPP v5.0 applications are given constant feedback about congestion levels in the SMSC 303 and router 304 giving them the opportunity to back off. If the load continues to rise then the gateway 302 will start to reduce the throttling quotas and window sizes for applications. Initially only applications with low service levels will be impacted, but as congestion within the messaging system increases more severe restrictions will be applied. At the same time the SMSC 303 and routers 304 may start to selectively stop accepting input at some interfaces (those of low priority/importance) or that is labeled as low priority. If the load continues to rise to the extent that individual routers 304 and SMSC 303 cannot cope then these systems will invoke their system wide overload functionality.

The localization of messages for individual destinations allows the router 304 to minimize the number of SMSC 303 that it must trigger delivery from when it receives an alert from the network. It also puts the router 304 in control of the sequencing and timing of the notification of the SMSC 303. The router 304 can stagger the notification of SMSC 303 to avoid conflict between SMS 303 when SM are stored on multiple SMSC 303. The localization of messages from a particular originator allows load sharing of SM over multiple SMSC 303 for a single destination address (e.g. for a major SMS voting event) while retaining the delivery sequence of the messages from one originator and providing a means to find that SM should the originator send a delete or query request for it.

Storing Status Reports in the SMSC

Routers 304 and gateways 302 can forward SR that they have failed to deliver to the SMSC 303 where they can be stored for delivery at a later time in the same way as SM. Within the SMSC 303 the procedures for handling SR can be identical to those used for SM. The only difference being the way in which SM and SR are encoded for transmission to the router or gateway for delivery. SR cannot be the target of message management commands.

Charging

When the router 304 determines that a SM (or alternatively a SR) must be forwarded to an SMSC 303 it can send a proprietary extension (to either SMPP or MAP). This extension informs the SMSC 303 what the router has done with the SM to date. If the extension indicates that the SM is not to be charged for in real-time then the SM bypasses all real-time charging checks. If the extension indicates that the SM must be charged for in real-time, but has not been charged for the SM it is checked (and possibly charged for) as if it was a normal MO SM direct from the mobile network 305. If the SM has been charged for by the router 304 then in addition the extension includes the charge reference number assigned to the SM by the router. The SMSC 303 can bypass charging checks for this SM, but must store the reference number and re-use it if it needs to send a refund for the SM (it can also log this reference number to assist in resolving customer queries).

Virtual Mobile Handling

Virtual Mobile messages do not need to be stored. They are already stored on another SMSC 303. However it may be desirable to store them locally when they cannot immediately be delivered to reduce the load on the local HLRs.

The interface between the router 304 and the SMSC 303 can retain the fact that an SM arrived at the router 304 as a mobile terminated message as opposed to as a mobile originated message.

In an embodiment where the GSM MAP Phase 3 protocol is used between the router 304 and the SMSC 303 then the indication that the SM arrived at the router 304 as a mobile terminated message can be achieved by forwarding MT SM in the same TPDU as it arrive in or on a special link. Alternatively an extension to the standard protocol can be used.

Concatenated SM Handling

The router 304 must ensure that as far as is practicable all parts of a concatenated SM are dealt with by the same network element to avoid out of sequence delivery. So if a router 304 is going to deliver any part of a concatenated SM then preferably it should buffer up all of the parts and deliver them. The alternative is for the router to pass all such messages to a single SMSC 303 that then takes responsibility for feeding them to a router in the correct order.

Reply Handling

If a router 304 accepts an SM that it has determined is a reply to a previous message that set a reply path flag (GSM TP-RP) then the router must convey that information to the SMSC 303 if it forwards the SM. This can be done by protocol extensions or by sending the message on a particular link.

Changes to Existing SMPP Operations

In an exemplary embodiment in accordance with the present method of processing a message, the following describes optional parameters that can be added to SMPP protocol defined operations.

"SUBMIT_SM" Operation

Add the following to the list of allowed optional fields:

| | Field Name | Type | Description | Ref. |
|---|---|---|---|---|
| OPTIONAL PARAMETERS | delivery_network_type | TLV | This parameter identifies the type of network over which delivery of this message has previously been attempted. If this parameter is absent then the SMSC should assume that no previous attempt has been made to deliver this SM. | |
| | error_reported | TLV | This parameter should only be present if delivery_network_type is also present. It is the error indication returned in response to the most recent failed attempt to deliver this SM. This parameter contains context information in addition to the error reported to identify the type of operation that failed (e.g. SendRoutingInfoForSM or ForwardShortMessage) and in addition the protocol layer reporting the error (e.g. is this a TCAP abort code or a MAP error? | |
| | reply | TLV | This parameter is only present if the network element submitting this SM has determined that the SM is a valid reply to a previously sent message and has a right to use this service center. Special handling for this SM may be needed in the SMSC. | |
| | virtual_mobile | TLV | If this parameter is present then the network element submitting this SM was acting in the role of an MS when it received this SM. Special handling for this SM may be needed in the SMSC. | |
| | charging_status | TLV | This parameter informs the SMSC what if any charging actions have been taken by the submitter of this SM. The SM may have been checked and found to not need real-time charging, it may have been checked and charged for or it may have been checked and accepted, but not yet charged for. If no charging actions have been taken | |
| | charging_reference | TLV | This parameter should only be present if charging_status indicates that this SM has been charged for. This parameter contains a unique transaction reference that the SMSC needs to send to the charging system if it needs to commit, rollback or refund this charge. | |

In an alternative embodiment in accordance with the present method of processing a message SMPP v3.4 and v5 protocol defined parameters can be reused by adding the optional parameters as described in the following table.

"DATA_SM" Operation

| Field Name | Type | Description | Ref. |
|---|---|---|---|
| network_error_code | TLV | For message submission on the SMSC to Router interface network_error_code & additional_status_info_text are treated as a group. If any one of these items is present | [SMPPv5] 4.8.4.42 |

| Field Name | Type | Description | Ref. |
|---|---|---|---|
| | | then both must be present. If both items are present then the SMSC will assume that the ESME made an attempt to deliver this message (SR or SM) and that these optional parameters describe the reason for this delivery attempt having failed. Otherwise the SMSC assumes that no attempt has been made to deliver this message.<br>Under certain circumstances the SMSC may return this information to the ESME (e.g. when forwarding an abandoned SM so that an SR can be raised or in an SR).<br>If the $1^{st}$ Octet is 7 then the $2^{nd}$ and $3^{rd}$ octets contain the least significant 16 bits of an SMPP command_status value. | |
| additional_status_info_text | TLV | See network_error_code. In addition this optional parameter contains further information about the failed delivery attempt.<br>Octet 1-2, failureType, defines the type of the error being reported in network_error_code.<br>Octet 3-4, failureCause, contains a further qualifier of the error if appropriate or "00" otherwise.<br>Octet 5-7, deliveryFailureReason is the Airwide Solutions internal error classification value and is used to avoid duplicating error mapping logic. Only send in the ESME to SMSC direction.<br>Octet 8, networkType is the type of delivery network that was used.<br>Octet 9-11, operationCode is the operation code of the network operation that resulted in the error being reported. Three digits, with leading zeroes. | [SMPPv5] 5.3.2.11 |
| billing_identification | TLV | This optional parameter can be sent by either the SMSC or the ESME. It communicates the current real time/pre-pay charging status of the message (SR or SM). If the sending system has no information to convey about the status of the message then this parameter is omitted. Note that although this parameter will initially only applies to SM its use may be extended to cover SR in a future release.<br>Octet 1: 0x80<br>Octets 2 to 58 are a text string (not null terminated) constructed from a number of fields separated by commas as follows:<br><prePayStatus.>, <billingFlags>, <source_node_dest_lsme><prePayModuleId>, <prePayBillingReference><br>billingFlags is mandatory. It is a string of flags identifying a number of features used by the message that may influence billing.<br>source_node_dest_lsme is the destination LSME assigned to the message by the router.<br>prePayModuleId is optional and is omitted if prePayStatus is any value other than 1.<br>prePayBillingReference is optional and is omitted if prePayStatus is any value other than 1. | [SMPPv5] 4.8.4.3 |

The billing_identification is an optional parameter can be sent by either the SMSC or the ESME. It communicates the current real time/pre-pay charging status of the message (SR or SM). When the sending system has no information to convey about the status of the message then this parameter is omitted. Note that although this parameter can apply to SM and SR.

Octet 1: 0x80

Octets 2 to 59 are a text string (not null terminated) constructed from a number of fields separated by commas as follows:

<prePayStatus>,<billingFlags>,<source_node_dest_int>, <prePayModuleId>, <prePayBillingReference> where:

prePayStatus is mandatory and is a single ASCII digit.

billingFlags is mandatory. It is a string of flags identifying a number of features used by the message that may influence billing.

source_node_dest_int is the destination interface assigned to the message by the router.

prePayModuleId is optional and is omitted if prePayStatus does not indicate that the message has been charged for.

prePayBillingReference is optional and is omitted if pre-PayStatus does not indicate that the message has been charged for.

The billingFlags parameter is a string of flags identifying a number of features used by the message that may influence billing. billingFlags is a string of ASCII digits. Each digit must be either 1 or 0. The meaning of the digits is:

| Digit | Meaning |
|---|---|
| 1 | Reverse Charge indicator. If TRUE then the SM should be charged to the recipient rather than the sender. |
| 2–16 | Reserved. Set to zeroes. |

The prePayStatus is an enumerated parameter that indicates what the router 304 has determined the status of this SM to be with regard to real-time pre-pay charging. If no credit check has been carried out for this SM then billing_identification is not sent (unless the router 304 has determined that the SM is from a post pay subscriber without needing a credit check e.g. by analysing the originator IMSI). prePayStatus is a single ASCII digit that can take on one of the following values.

| Value | Meaning |
|---|---|
| 0 | Message is not eligible for real time charging. |
| 1 | Message is eligible for real time charging. Has not been charged for yet. |
| 3 | Message is eligible for real time charging. Has been successfully charged for by the ESME. |
| 4 | The ESME has determined that the SM is a reply to an SM that had TP-RP set and should thus bypass certain validation checks. The message is not eligible for real time charging. |
| 5 | The ESME has determined that the SM is a reply to an SM that had TP-RP set and should thus bypass certain validation checks. The recipient has not been successfully charged in real time for this message by the ESME. |
| 7 | The ESME has determined that the SM is a reply to an SM that had TP-RP set and should thus bypass certain validation checks. The recipient has been successfully charged in real time for this message by the ESME. |

When no successful credit check has been carried out for the SM then the prePayModuleId parameter is not sent. This is the identifier for the component of the router 304 that initiated the credit check for this SM. It is used as part of the unique identify for a pre-pay system transaction. To uniquely identify a pre-pay transaction the combination of PrePayModuleId and PrePayBillingReference can be used. When no credit check has been carried out for this SM or the credit check returned a response indicating that the message should not be charged for by this means then this parameter is not sent. The exact format and content of this parameter depends on the pre-pay protocol enabled in a sending router 304

When no successful credit check has been carried out for the SM the prePayBillingReference parameter is not sent. This parameter contains the reference number used as part of the unique identity for a pre-pay system transaction. To uniquely identify a pre-pay transaction use the combination of prePayModuleId and prePayBillingReference.

The source_node_dest_int field is mandatory. It identifies the destination interface assigned to the message by the router 304. This is necessary to ensure consistency of router traffic events and assists the router 304 in routing a message to a delivery interface. This item is not used by the SMSC 303 it is simply held on behalf of the router 304 and returned to it. This field is ASCII digits and has a maximum length of 3 digits. If the SM was not submitted through a router and so the SMSC 303 does not have a value for this attribute then the SMSC 303 sets it to 0.

This section describes the usage by the router of the additional_status_info_text TLV. When used in DELIVERY_REQUEST the additional_status_info_text parameter is formatted as follows:

Only sent in DATA_SM in the ESME to SMSC 303 direction. Sent in DATA_SM_RESP when command_status=ESME_RDELIVERYFAILURE.

In addition the additional_status_info_text optional parameter contains further information about the failed delivery attempt (See network_error code.). Octet 1-2, failureType, defines the type of the error being reported in network_error_code. Octet 3-4, failureCause, contains a further qualifier of the error when appropriate or "00" otherwise. Octet 5-7, deliveryFailureReason is the Airwide Solutions internal error classification value and is used to avoid duplicating error mapping logic. Only sent in the ESME to SMSC direction. Octet 8, networkType is the type of delivery network that was used. Octet 9-11, operationCode is the operation code of the network operation that resulted in the error being reported. Three digits, with leading zeroes.

In an alternative embodiment the additional_status_info_text parameter can be used in the DELIVERY_REQUEST operation when the ANSI-41 protocol is used.

The failureType parameter sets the context for networkError and failureCause. It identifies both the delivery network used and the protocol layer reporting the error.

The failureCause parameter can contain one of the following MAP errors that provide additional information about the cause of the error. This information is used by the SMSC 303 in order to select the correct retry schedule:

Absent Subscriber (Phase 3) has a diagnostic called absentSubscriberDiagnosticSM;
Call Barred has a diagnostic called callBarringCause;
System Failure has a diagnostic called networkResource;
SM Delivery Failure has a diagnostic called sm-EnumeratedDeliveryFailureCause.

When the failureCause parameter is present then it contains the hexadecimal representation of the diagnostic.

The deliveryFailureReason parameter can contain a vendor specific internal delivery classification. These Delivery Failure Reasons are used to control the way in which the SMSC 303 handles a message after a failed delivery attempt.

The networkType parameter can duplicate the Network Type sub-field of network_error_code, but is preferred because the network_error_code does not discriminate between GPRS and GSM CSD—both are lumped together as GSM. The SMSC 303 can use the networkType parameter to differentiate between GPRS and GSM CSD.

| Value | Network type |
|---|---|
| 1 | ANSI 136 Access Denied Reason |
| 2 | IS 95 Access Denied reason |
| 3 | GSM - CSD |
| 4 | ANSI 136 Cause Code |
| 5 | IS 95 Cause Code |
| 6 | ANSI-41 Error |
| 7 | SMPP Error |

-continued

| Value | Network type |
|---|---|
| 8 | Message Centre Specific |
| 9 | GSM - GPRS |

The network_error_code parameter can be used by the router 304 or gateway 302 and can contain the following SMPP v5 defined values.

| Value | Reason |
|---|---|
| 0x0000 | Message store busy |
| 0x0001 | SME interface busy |
| 0x0002 | Other error |
| 0x001E | Call barred by network operator (no credit remaining) |
| 0x001F | Call barred by network operator (no connect time remaining) |
| 0x0021 | Pre-Pay system not responding |

Figure 4:
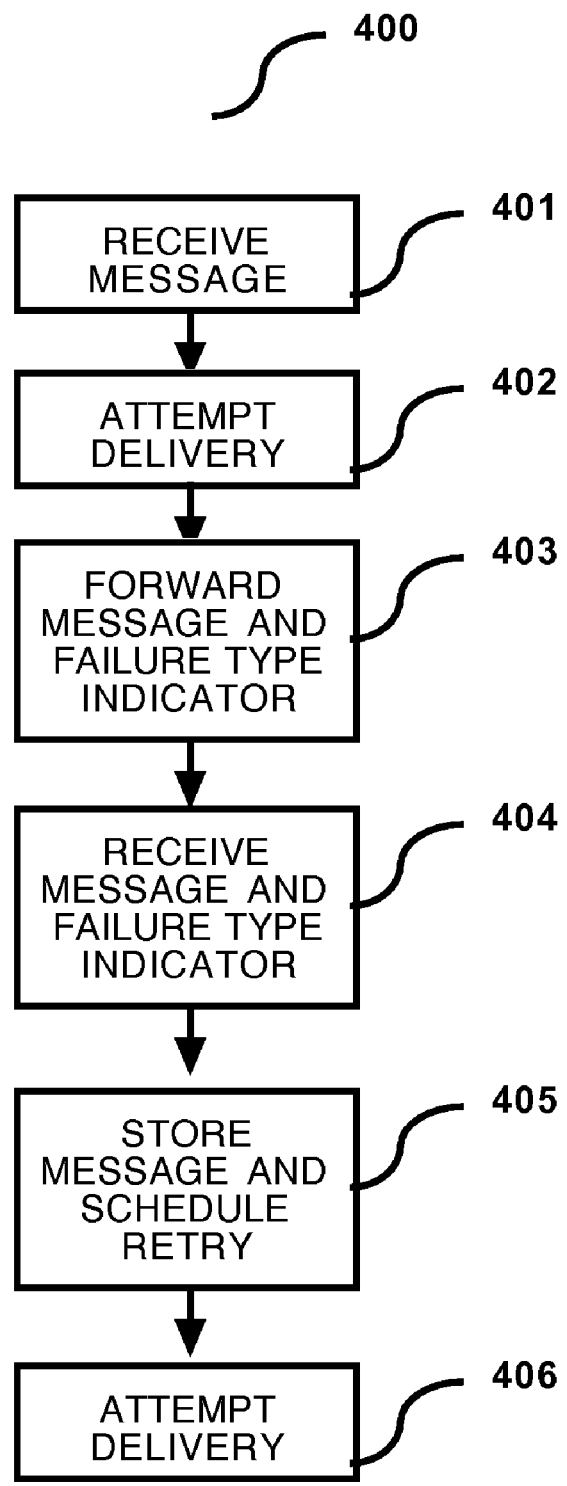
FIG. 4 is a flow chart representing the steps in an exemplary embodiment of the method for processing a message.

FIG. 4 is flow chart representing the steps in an exemplary embodiment of the method 400 for processing a message. The method 400 can be implemented in a messaging service environment such as, for example, that shown in FIG. 3 and described above with a router 304 connected to a mobile communication network 305 adapted to receiving and forwarding the message, a gateway 302 connected to a fixed communication network adapted to receiving and forwarding the message, and a service center 303 adapted to receiving, storing and forwarding the message, each of the router 304, gateway 302 and service center 303 being inter-connected for forwarding and receiving the message. The steps of the method 400 are described with reference to the details of exemplary embodiments provided in the description above. The message is received 401 at either the router 304 or the gateway 302 from a sender via either the mobile network 305 or the fixed network respectively. An attempt is made, from whichever of the router 304 and the gateway 302 received the message, to deliver 402 the message to a recipient via either mobile network or the fixed network depending on where the recipient is located. If the delivery attempt fails, the message and a failure type indicator are forwarded 403 from whichever of the router 304 and the gateway 302 received the message to the service center 303. The failure type indicator can be contained in a private extension of the mo-ForwardSM operation of the GSM MAP, in a Message Delivery Point-to-Point operation of the ANSI-41 MAP, in one of the SUBMIT-SM and the DATA_SM operations of the Short Message Peer to Peer protocol, or other similar operations in other protocols as described above. In an alternative embodiment a charge indicator can also be forwarded to the service center 303 in step 403. Step 403 can also optionally include forwarding of a virtual mobile indicator when the receiver is located in the fixed communication network and is acting in the role of a receiver located in the mobile communication network 305 and a reply indicator when the message is determined to be a reply to a previous message giving permission for the reply to be sent via the service center 303. The message and a failure type indicator are received 404 at the service center 303. When the charge indicator has been forwarded, in step 404 charging checks in the service center 303 can be bypassed when the charging indicator indicates that the message is not to be charged for in real-time and charging checks can be applied in the service center 303 when the charging indicator indicates that the message is to be charged for in real-time and that the message has not been charger for by the router 304. In a further alternative embodiment, a charge reference number can also be forwarded to the service center 303 in step 403 and in step 404 the charge reference number can be stored and charging checks in the service center 303 can be bypassed when the charging indicator indicates that the message has been charged for by the router 304. The message is stored and an attempt to deliver the message is scheduled 405 at a retry time if the failure type indicator indicates that the previous attempt to delivery the message (see step 402) failed due to a mobile network 305 error (e.g. "Absent Subscriber" or "SIM Card Full"). The retry time can be a function of the failure type indicator when the failure type indicator indicates a recipient unreachable failure. When the retry time is reached, an attempt is made, from the service center 303, to deliver 406 the message to the recipient via either mobile network 305 or the fixed network depending on where the recipient is located. Alternatively, an attempt to deliver the message from the service center 303 to the recipient can be made responsive to a deliver request received from the router 304 or gateway 302, the router 304 or gateway 302 sends the deliver request responsive to receiving an alert from the mobile communication network 305 that the recipient is reachable.

Figure 5:
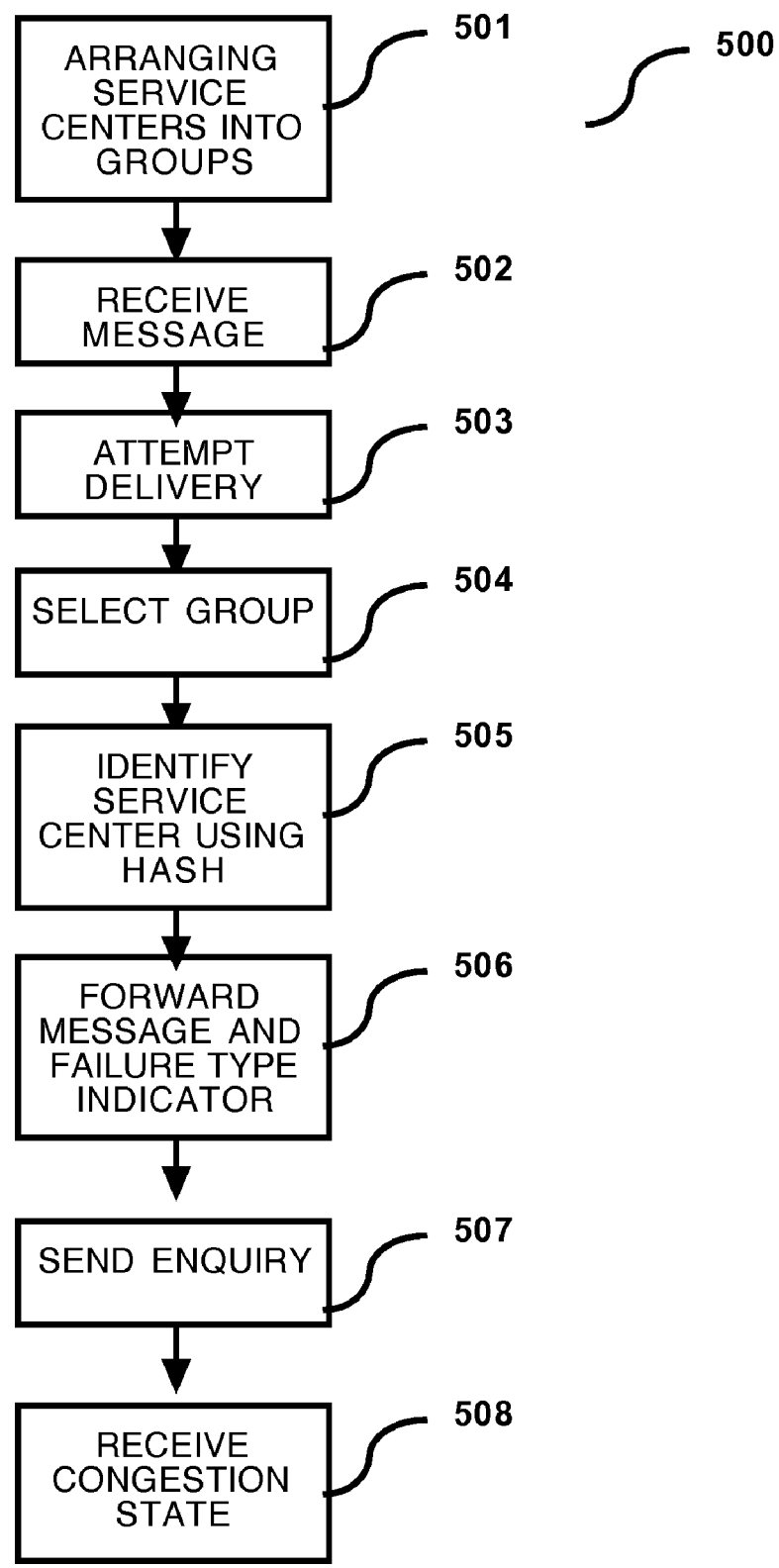
FIG. 5 is a flow chart representing the steps in another exemplary embodiment of the method for processing a message.

FIG. 5 is flow chart representing the steps in another exemplary embodiment of the method 500 for processing a message. The method 500 can be implement in a messaging service environment having a router 304 connected to a mobile communication network 305 adapted to receiving and forwarding the message, a gateway 302 connected to a fixed communication network adapted to receiving and forwarding the message, and a plurality of service centers 303 each adapted to receiving, storing and forwarding the message, each of the router 304, gateway 302 and service center 303 being inter-connected for forwarding and receiving the message. The steps of the method 500 are described with reference to the details of exemplary embodiments provided in the description above. Each of the plurality of service centers 303 is arranged 501 into one of a plurality of service center groups. The message is received 502 at the router 304 from a sender via the mobile communication network 305. An attempt is made to deliver 403 the message from the router 304 to a recipient via either mobile network 305 or the fixed network depending on where the recipient is located. One of the groups from the plurality of groups is selected 504 based on a pre-determined set of rules. One of the service centers 303 with the selected group is identified 505 based on the application of hash algorithm. The hash algorithm can, for example, use as input the destination address of the message when the message is MT or alternatively the originating address can be used as input when the message is FT. The hash algorithm can be biased to identifying a service center 303 in the selected group having greater capacity relative to the other service centers in the group. The capacity associated with any one of the service centers 303 can be reduced in pre-determined increments responsive to a congestion state of the service center 303 exceeding a pre-determined threshold by a number of incremental thresholds. The capacity associated with any one of the service centers 303 in the selected group can be reduced to zero when the congestion state of the service center 303 reaches 100% and the hash algorithm can exclude from being identified any service center when the service center 303 has zero capacity. If the attempt to deliver the message fails, the message and a failure type indicator can be forwarded 506 to the service center. 303 Optionally, an enquiry can be sent 507, at intervals, from the router to any service centers 303 having a congestion state of 100% and the router 304 can receive a response 508 from the service center 303 including the congestion state of the service center 303. The router 304 can use the congestion state received in step 508 to reset the capacity of a router 304 previously having zero capacity.

The method 400, 500 according to the present invention can be implemented by a computer program product comprising computer executable program instructions stored on a computer-readable storage medium.

It will be apparent to one skilled in the art that numerous modifications and departures from the specific embodiments described herein may be made without departing from the spirit and scope of the present invention.

The invention claimed is:

1. A method for processing a message in a short message service, the method comprising:
   receiving the message and a failure type indicator at a service center, from one of a router connected to a mobile communication network adapted to receiving and forwarding messages, and a gateway connected to a fixed communication network adapted to receiving and forwarding messages,
   each of the router, gateway and service center being inter-connected for forwarding and receiving messages, the failure type indicator indicating that an attempt to deliver the message to a recipient has failed in the router or in the gateway and a reason for the failure;
   storing the message and scheduling an attempt to deliver the message to the recipient at a retry time responsive to the failure type indicator, wherein the retry time depends on the failure type indicator; and
   attempting to deliver the message from the service center to the recipient via one of the router and the gateway, responsive to which of the mobile communication network and the fixed communication network the recipient is located in, when the retry time is reached.

2. The method of claim 1, wherein the failure type indicator is contained in a private extension of the mo-ForwardSM operation of the Global System for Mobile communication (GSM) Mobile Application Part (MAP) protocol.

3. The method of claim 1, wherein the failure type indicator is contained in a private extension of the Message Delivery Point-to-Point operation of the American National Standards Institute-41 (ANSI-41) Mobile Application Part (MAP) protocol.

4. The method of claim 1, wherein the failure type indicator is contained in a vendor specific parameter of one of the SUBMIT-SM and the DATA_SM operations of the Short Message Peer to Peer protocol.

5. The method of claim 1, wherein the retry time is a function of the failure type indicator when the failure type indicator indicates a recipient unreachable failure.

6. The method of claim 1, further comprising:
   attempting to deliver the message from the service center to the recipient responsive to a deliver request received from the router; wherein the router sends the deliver request responsive to receiving an alert that the recipient is reachable.

7. The method of claim 1, wherein the step of receiving the message and the failure type indicator further includes receiving a fee charging indicator; the method further comprising:
   bypassing fee charging checks in the service center when the fee charging indicator indicates that the message is not to be charged for in real-time; and
   applying charging checks in the service center when the fee charging indicator indicates that the message is to be charged for in real-time and that the message has not been charger for by the router.

8. The method of claim 7, wherein the step of receiving the message, the failure type indicator and the fee charging indicator further includes receiving a charge reference number when the fee charging indicator indicates that the message has been charged for by the router; and further comprising:
   bypassing fee charging checks in the service center and storing the charge reference number when the charging indicator indicates that the message has been charged for by the router.

9. The method of claim 1, wherein the step of receiving the message and the failure type indicator further includes receiving a virtual mobile indicator when the receiver is located in the fixed communication network and is acting in the role of a receiver located in the mobile communication network.

10. The method of claim 1, wherein the step of receiving the message and the failure type indicator further includes receiving a reply indicator when the message is determined to be a reply to a previous message giving permission for the reply to be sent via the service center.

11. A method for processing a message in a short message service having a router connected to a mobile communication network adapted to receiving and forwarding the message, a gateway connected to a fixed communication network adapted to receiving and forwarding the message, and a plurality of service centers each adapted to receiving, storing and forwarding the message, each of the router, gateway and service center being inter-connected for forwarding and receiving the message, the method comprising the steps of:
   arranging each one of the plurality of service centers into one of a plurality of service center groups;
   receiving the message at the router or at the gateway from a sender;
   attempting to deliver the message from the router or from the gateway to a recipient responsive to which of the mobile communication network and the fixed communication network the recipient is located in;
   selecting one group from of the plurality of service centers groups based on a pre-determined set of rules;
   identifying one of the service centers within the select group based on applying a hash algorithm to one of a destination address of the message and an originating address of the message, the hash algorithm being biased to identifying a service center in the selected group having greater capacity relative to the other service centers in the group; and
   forwarding the message and a failure type indicator from the router or from the gateway to the identified service center when the attempt to deliver the message to the recipient fails, wherein the failure type indicator indicates that an attempt to deliver the message to a recipient has failed in the router or in the gateway and a reason for the failure, wherein the failure type indicator is configured to influence retry time of delivery scheduling in the service center.

12. The method of claim 11, wherein the capacity associated with any one of the service centers in the selected group is reduced in pre-determined increments responsive to a congestion state of the service center exceeding a pre-determined threshold by a number of incremental thresholds.

13. The method of claim 12, wherein the congestion state of each service center is determined based on a congestion state parameter included in a response received at the router to a message previously sent to the service center.

14. The method of claim 12, wherein the capacity associated with any one of the service centers in the selected group is reduced to zero when the congestion state of the service center reaches 100%; and wherein the hash algorithm will not identify the service center when the service center has zero capacity.

15. The method of claim 14, further comprising the steps of:
- sending an enquiry, at intervals, from the router to any service centers having a congestion state of 100%; and
- receiving, at the router, a response from the service center including the congestion state of the service center.

16. A service center for processing a message in a short message service, the short message service further comprising a router connected to a mobile communication network adapted to receiving and forwarding messages, and a gateway, connected to a fixed communication network adapted to receiving and forwarding messages, each of the router, gateway and service center being inter-connected for forwarding and receiving the message, that received the message, the service center comprising:
- an input configured to receive the message and a failure type indicator from the one of the router and the gateway, the failure type indicator indicating that an attempt to deliver the message to the recipient has failed in the router or in the gateway;
- a storage configured to store the message and scheduling an attempt to deliver the message to the recipient at a retry time responsive to the failure type indicator, wherein the retry time depends on the failure type indicator; and
- an output configured to attempt to deliver the message from the service center to the recipient via one of the router and the gateway, responsive to which of the mobile communication network and the fixed communication network the recipient is located in, when the retry time is reached.

17. An apparatus for processing a message in a short message service, the apparatus being a router connected to a mobile communication network adapted to receiving and forwarding the message, or a gateway connected to a fixed communication network adapted to receiving and forwarding the message, the short message service further comprising a plurality of service centers each adapted to receiving, storing and forwarding the message,
- the apparatus being configured to arrange each one of the plurality of service centers into one of a plurality of service center groups; and comprising
- an input configured to receive the message from a sender; and
- an output configured to attempt to deliver the message to a recipient responsive to which of the mobile communication network and the fixed communication network the recipient is located in;
- the apparatus being configured to select one group from of the plurality of service centers groups based on a predetermined set of rules; and
- identify one of the service centers within the select group based on applying a hash algorithm to one of a destination address of the message and an originating address of the message, the hash algorithm being biased to identifying a service center in the selected group having greater capacity relative to the other service centers in the group; the apparatus further comprising
- an output configured to forward the message and a failure type indicator to the identified service center when the attempt to deliver the message to the recipient fails, wherein the failure type indicator indicates that an attempt to deliver the message to a recipient has failed in the router or in the gateway and a reason for the failure, wherein the failure type indicator is configured to influence retry time of delivery scheduling in the service center.

* * * * *